United States Patent [19]
Fujino

[11] Patent Number: 6,113,082
[45] Date of Patent: Sep. 5, 2000

[54] SPRING

[75] Inventor: Izou Fujino, Matsudo, Japan

[73] Assignee: Nishikawa Sangyo Co., Ltd., Tokyo, Japan

[21] Appl. No.: 09/104,617

[22] Filed: Jun. 25, 1998

[30] Foreign Application Priority Data

| Jun. 27, 1997 | [JP] | Japan | ................................. 9-186003 |
| Jul. 2, 1997 | [JP] | Japan | ................................. 9-191881 |
| Aug. 26, 1997 | [JP] | Japan | ................................. 9-246131 |

[51] Int. Cl.⁷ .............................. F16F 3/00; A47C 23/04
[52] U.S. Cl. ................................. 267/103; 267/110; 5/719
[58] Field of Search .................... 267/103, 110; 5/719, 247, 255

[56] References Cited

U.S. PATENT DOCUMENTS

| 2,979,739 | 4/1961 | Krakauer | ..................................... 5/345 |
| 3,638,254 | 2/1972 | Falkenau | ..................................... 5/351 |
| 3,815,887 | 6/1974 | Curtis et al. | .............................. 267/91 |
| 3,879,025 | 4/1975 | Dillard | ..................................... 267/165 |
| 5,165,125 | 11/1992 | Callaway | ..................................... 5/247 |
| 5,558,314 | 9/1996 | Weinstein | ................................. 267/91 |
| 5,588,165 | 12/1996 | Fromme | ..................................... 5/247 |
| 5,632,473 | 5/1997 | Dias Magalhaes Queiroz | ....... 267/164 |
| 5,785,303 | 7/1998 | Kutschi | .................................... 267/103 |

FOREIGN PATENT DOCUMENTS

| 2015659 | 10/1970 | Germany . |
| 337482 | 11/1930 | United Kingdom . |

*Primary Examiner*—Robert J. Oberleitner
*Assistant Examiner*—Bradley King
*Attorney, Agent, or Firm*—Hogan & Hartson, LLP

[57] ABSTRACT

Disclosed is a spring formed from a synthetic resin into one body, including: a plurality of annular members arranged in such a manner as to be coaxial with each other and spaced in parallel to each other; and elastic linkage members for linking the annular members to each other at a plurality of points. In the spring, each of the elastic linkage members is arranged along a virtual cylindrical face formed by the annular members and formed into a lying U-shape curved in the peripheral direction of the annular members; radii of adjacent ones of the annular members are different from each other; and one end portion and the other end portion of each of the elastic linkage members, which portions are respectively linked to the adjacent ones of the annular members, are not overlapped to each other in the axial direction. These springs are locked integrally with a pair of upper and lower network plane members, which members include over the surfaces thereof locking members for locking upper and lower ends of the springs respectively, in such a manner as to be held therebetween, to form a spring assembly for a mattress.

7 Claims, 9 Drawing Sheets

SPRING

BACKGROUND OF THE INVENTION

1. Field of the Invention

The present invention relates to an improved spring made from a synthetic resin which is developed for a mattress and is also applicable as other cushioning elements and elastic elements, and to a spring assembly for a mattress using the springs.

2. Description of the Prior Art

As a mattress for bedding such as a bed, there has been employed a spring assembly of a type in which a number of metal coil springs, metal torsion bars or the like are flatly, uniformly distributed and in such a state, upper and lower edges of adjacent ones thereof are flatly joined to each other and an outer peripheral edge of the spring assembly is surrounded by a wire rod or the like. Such a spring assembly, however, is generally disadvantageous in that the complicated structure leads to the poor productivity; a lot of labor is required to handle the heavy spring assembly upon transportation or the like thereof; creak and rust occur in service thereof; and the spring assembly is poor in matching with a fiber material such as a wrapping texture.

To cope with these inconveniences, studies have been made to develop, as an alternative of the conventional metal spring, a plastic spring having merits of reducing the weight, eliminating occurrence of noise, and enhancing the productivity. Such a plastic spring can be formed into a shape quite different from that of the conventional metal spring by making use of a molding process generally adopted for forming plastic products. With such a geometrical effect, a plastic spring is allowed to ensure dynamic characteristics being large enough to compensate for the poor strength of a plastic material used for the plastic spring.

The above-described plastic spring, however, has a problem that when the spring is elastically deformed up to a critical geometry caused by an excessive compressive load applied thereto, the supporting state of the spring may become unstable due to the poor strength of the plastic material, and at the worst case, there occurs breakage of the spring.

With respect to a spring assembly for a mattress using a number of single plastic springs, it is expected to develop a new structure having merits in terms of material and manufacturing technique thereof.

BRIEF SUMMARY OF THE INVENTION

In view of the foregoing, the present invention has been made, and an object of the present invention is to provide a spring having merits of reducing the weight, eliminating occurrence of noise, enhancing the productivity, and allowing a large elastic deformation per unit size of the spring.

Another object of the present invention is to provide a spring of stabilizing a supporting state of the spring and preventing breakage thereof even when an excessive compressive load is applied thereto.

A further object of the present invention is to provide a spring assembly for a mattress, which is lightweight, easy in handling, good in matching with a fiber material portion such as a side texture, and preferable in productivity.

To achieve the above objects, according to a first aspect of the present invention, there is provided a spring formed from a synthetic resin into one body, including: a plurality of annular members arranged in such a manner as to be coaxial with each other and spaced in parallel to each other; and elastic linkage members for linking the annular members to each other at a plurality of points, each of the elastic linkage members being arranged along a virtual cylindrical face formed by the annular members and formed into a lying U-shape curved in the peripheral direction of the annular members; wherein radii of adjacent ones of the annular members are different from each other; and one end portion and the other end portion of each of the elastic linkage members, whose portions are respectively linked to the adjacent ones of the annular members, are not overlapped to each other in the axial direction. With this configuration, the spring allows a large elastic deformation per unit size because of prevention of contact between one-end portions and the other end portions of the elastic linkage members upon elastic deformation, and also the spring exhibits other merits of significantly reducing the weight as compared with the metal coil spring, metal torsion bar or the like having been generally used; extremely increasing an elastic force per unit weight of a synthetic resin material used for the spring; eliminating occurrence of creak and rust; and reducing a manufacturing cost by forming the spring using a molding process. The spring having the above merits is expected to be extensively used not only for a mattress but also for elastic elements and cushioning elements.

In the above spring, preferably, each of the annular members has cutouts at portions thereof to be axially overlapped to curved portions of those, of the elastic linkage members, adjacent to the annular member. With this configuration, the spring is capable of ensuring a large allowable elastic deformation while preventing contact or interference between the elastic linkage members and each of the annular members, and eliminating occurrence of noise.

In the above spring, preferably, the one end portion and the other end portion of each of the elastic linkage members are offset from each other in the peripheral direction of the annular members to make a length of an arm of the elastic linkage member on the one end portion side being different from a length of an arm of the elastic linkage member on the other end portion side; and the one of the annular members, linked to the longer arms of the elastic linkage members, has the cutouts. With this configuration, since the deformation of the elastic linkage members is offset on the side of the annular member provided with the cutouts upon elastic deformation, the spring is allowed to ensure a large allowable elastic deformation by making effective use of an internal space of the spring; and since the contact between the elastic linkage members and the other annular member opposed to that provided with the cutouts is suppressed, this configuration is advantageously applied to the spring where it is difficult from the structural viewpoint to form cutouts in the other annular member.

Further, in the above spring, preferably, a restriction plate is provided on an outer or inner peripheral side of the one of the annular members on both sides of which the elastic linkage members are positioned with the annular member held therebetween, for preventing the elastic linkage members from interfering with each other. With this configuration, the spring is allowed to ensure a large allowable elastic deformation per unit size because of prevention of contact between one-end portions and the other end portions of the elastic linkage members upon elastic deformation, and also the spring is allowed to prevent contact or interference between the elastic linkage members and instability of the supporting state due to the contact therebetween or prevent breakage of the spring even when an excessive compressive load is applied thereto, and hence to ensure the stable supporting state.

To achieve the above objects, according to a second aspect of the present invention, there is provided a spring assembly for a mattress, including: a plurality of springs made from a synthetic resin; and a pair of upper and lower network plane members including, over the surfaces thereof, locking members for locking upper and lower ends of the springs, respectively; wherein the springs are locked integrally with the pair of upper and lower network plane members in such a manner as to be held therebetween. With this configuration, the spring assembly is allowed to be significantly lightweight as compared with the conventional one using metal coil springs, metal torsion bars or the like, easy in handling of a mattress formed of the spring assembly, good in matching with a fiber material such as a wrapping texture, capable of eliminating problems such as rust, and low in manufacturing cost by forming the components of the spring assembly as molded products and assembling the components only by locking or fitting without the need of adhesive bonding and/or fusion. Such a spring assembly is expected to be extensively used not only for a mattress but also for elastic members and cushioning elements such as a chair, sofa, and cushion. Also spring assemblies for various mattresses different in feeling can be easily obtained by preparing a plurality of kinds different in hardness/flexibility, height, and shape for each of the upper and lower network plane members and springs, and changing the combination thereof.

In the spring assembly, preferably, the spring includes a plurality of annular members arranged in such a manner as to be coaxial with each other and spaced in parallel to each other and elastic linkage members for linking the annular members to each other at a plurality of points, and the spring is formed from a synthetic resin into one body as a whole. With this configuration, the spring, which is made from a synthetic resin inferior in rigidity to a metal material, is allowed to ensure the good stability and durability, and also to ensure a significantly large elastic force per unit weight of the synthetic resin used. Further, the spring assembly is allowed to suppress unnecessary vibration and swinging caused upon turn-over of a user in bed or the like by cushioning and vibration-proof functions due to the viscoelasticities of the synthetic resin materials used for the spring assembly, to eliminate occurrence of creak as in the conventional metal spring assembly for a mattress, and to constitute a mattress good in permeability because of the presence of a number of air-gap portions.

In the spring assembly, preferably, each of the network plane members includes annular bodies flatly joined to each other, each of the annular bodies being formed into a shape corresponding to an upper or lower end of each of the springs; and each of the annular bodies includes a plurality of locking members, spaced in the peripheral direction of the annular body, for locking the uppermost or lowermost one of the annular members of each of the springs. With this configuration, the spring assembly is allowed to ensure a stable supporting state because a load is suitably, flatly distributed by means of the network plane members and the springs located at positions to which the load is applied are independently elastically deformed depending on pressures applied thereto; and also the spring assembly is allowed to constitute a mattress good in permeability because of the structural stability and the opening ratio as large as possible of the network plane members in addition to the above configuration of the springs.

Further, in the above spring assembly, preferably, the upper ones and lower ones of the locking members respectively provided on the upper and lower network plane members are offset from each other so as not to be overlapped to each other in the vertical direction. With this configuration, particularly, for the spring assembly used for a mattress having a small thickness, a stable supporting state can be ensured because of prevention of contact or interference between the upper and lower locking members even when an excessive compressive load is applied to the spring assembly.

DETAILED DESCRIPTION OF THE PREFERRED EMBODIMENTS

Hereinafter, preferred embodiments of the present invention will be described with reference to the accompanying drawings.

FIGS. 1 to 4 show a first embodiment of a spring according to the present invention. Referring to these figures, a spring 1 of the present invention includes a central annular member 2, upper and lower annular members 3, and a plurality of elastic linkage members 4. The upper and lower annular members 3 are respectively disposed in parallel on upper and lower sides of the annular member 2 in such a manner as to be coaxial to the central annular member 2 and to be each spaced a gap d apart from the central annular member 2. The elastic linkage members 4, each of which is formed into a lying U-shape, are provided to link the central annular member 2 to each of the upper and lower annular members 3 at three circumferential positions.

Of these annular members 2 and 3, each of the upper and lower annular members 3 has the same radius r3 and the central annular member 2 has a radius r2 smaller than the radius r3 of each of the upper and lower annular member 3.

Each elastic linkage member 4 is disposed along a virtual cylindrical face 5 formed into an approximately hand-drum shape by the annular members 2 and 3. For this elastic linkage member 4, one end portion 41 continuous to the central annular member 2 and the other end portion 42 continuous to each of the upper and lower annular members 3 are offset from each other in the radial direction so as not to be overlapped to each other in the axial direction C (expansion/contraction direction of the spring 1), that is, in the vertical direction in FIG. 2 when the spring 1 is compressed. In addition, the one end portion 41 and the other end portion 42 of the elastic linkage member 4 are basically located at the same angular position in the peripheral direction of the annular members 2 and 3; however, in the embodiment shown in the figures, based on the other end portion 42, the one end portion 41 continuous to the central annular member 2 having a small diameter is slightly offset to a curved portion 43 side in the peripheral direction for the reason described later, and accordingly, the elastic linkage member 4 has an arm 41a on the one end portion 41 side, which arm is slightly shorter than an arm 42a on the other end portion 42 side.

Each of the upper and lower annular members 3 has arched cutouts 33 on the inner peripheral side to which the curved portions 43 of the elastic linkage members 4 are overlapped in the axial direction C. In addition, the cutout 33 may be replaced with a portion formed by projectingly curving the annular member 3 on the outer peripheral side, or a through-hole or a fitting recess depending on the shape of the annular member 3.

Figure 1:
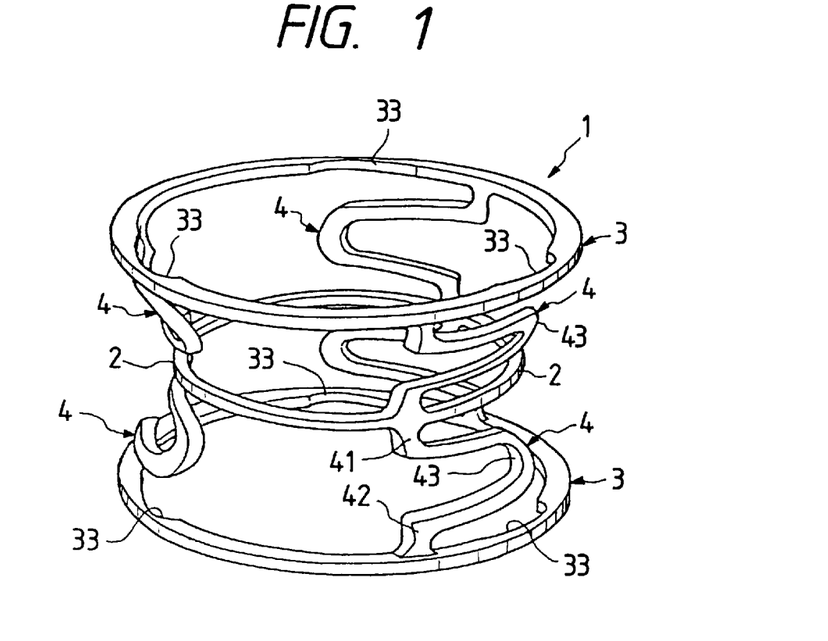
FIG. 1 is a perspective view showing a first embodiment of a spring according to the present invention.
Figure 2:
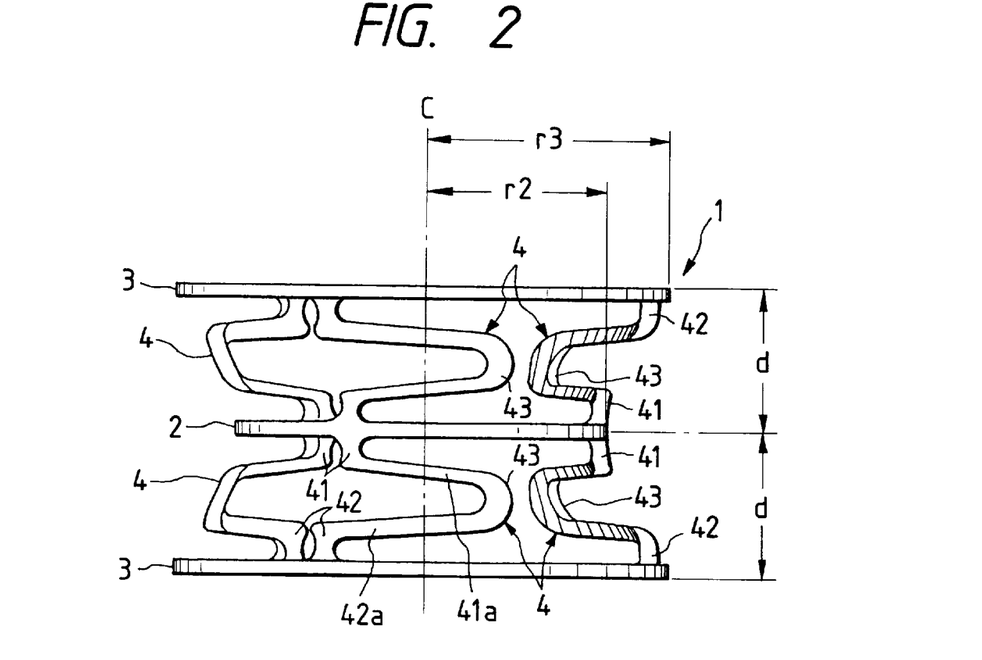
FIG. 2 is a front view showing the first embodiment of the spring.
Figure 3:
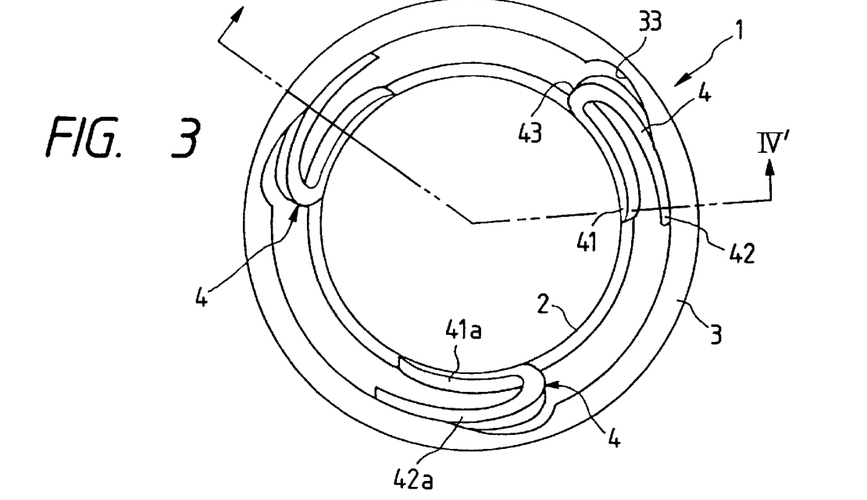
FIG. 3 is a plan view showing the first embodiment of the spring.
Figure 4:
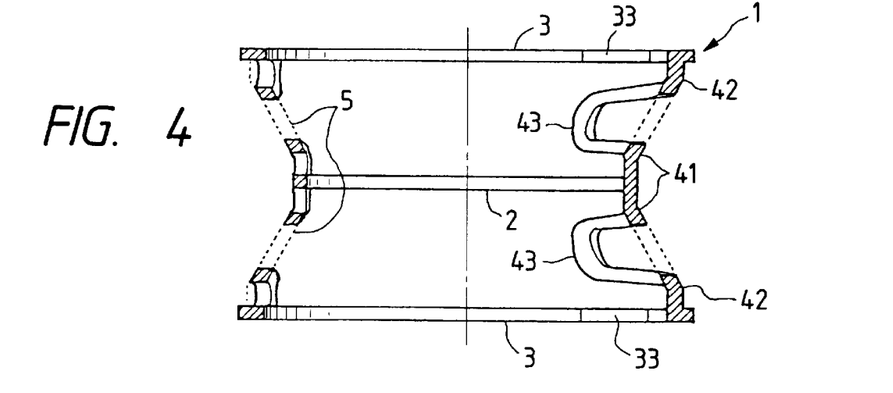
FIG. 4 is a sectional view taken on line IV–IV' of FIG. 3.

The spring 1 is molded from a synthetic resin into one body typically using a die. To be more specific, the spring 1 shown in the figure can be molded at a high moldability using a core divided into two parts in the vertical direction in the figure and a slide-type cavity divided into three parts in the same direction. As a material for forming the spring, there may be suitably used a resin being high in bending strength, particularly, high in repeated bending stress, for example, a polypropylene, polyamide, or polyacetal based resin.

Figure 5:
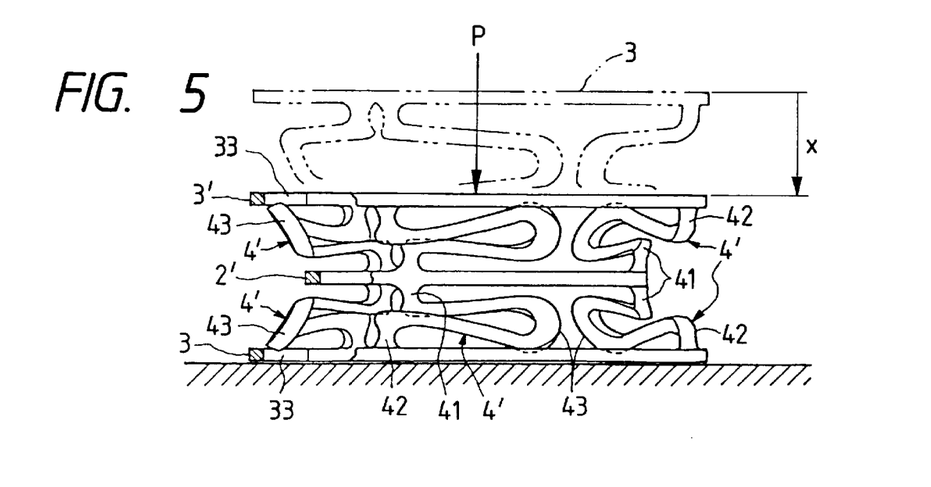
FIG. 5 is a front view with a portion cutaway, showing a state in which the first embodiment of the spring is elastically deformed.

When a (uniformly distributed) compressive load P is applied to the spring 1 having the above configuration in the axial direction C, each elastic linkage member 4 is made flex as indicated by reference numeral 4' shown in FIG. 5 in the direction where the height (equivalent to the gap d) of the lying U-shape of the elastic linkage member 4 shrinks. As a result, the spring 1 is compressed an elastic deformation x as a whole and is then kept in an equilibrium state.

In this case, since the one end portion 41 and the other end portion 42 of each elastic linkage member 4' are offset from each other in the radial direction as described above, they are not allowed to be in contact with each other. Accordingly, the spring 1 allows the elastic deformation x larger than that of a spring having a simple cylindrical shape in which each of the annular members 2 and 3 has the same radius, and further, the spring 1 prevents occurrence of noise due to contact or interference between the one-end portions 41 and the other end portions 42.

The cutouts 33 formed in each of the upper and lower annular members 3 are effective to prevent contact or interference between each of the annular members 3 and the curved portions 43 of the elastic linkage members 4, and hence to increase the elastic deformation x and prevent occurrence of noise.

In this spring 1, as described above, the one end portion 41 and the other end portion 42 of each elastic linkage member 4 are slightly offset from each other in the peripheral direction of the annular members 2 and 3 to make the arm 41a on the one end portion 41 side being slightly shorter than that of the arm 42a on the other end portion 42 side, and accordingly, the curved portion 43 of the elastic linkage member 4 is offset on the side of each of the upper and lower annular members 3 upon elastic deformation of the elastic linkage member 4, to thus correspondingly suppress the degree of contact of the curved portion 43 with the central annular member 2 formed with no cutout. In this way, the elastic deformation of each elastic linkage member 4 can be set in a desired direction by suitably selecting the linkage position, shape and the like, and consequently, the allowable elastic deformation x of the spring 1 can be maximized by making effective use of the internal space of the spring 1.

In the above embodiment, the spring 1 is formed into the hand-drum shape by the central annular member 2, the upper and lower annular members 2 and 3, and the upper and lower elastic linkage members 4; however, the number of stages of the annular members and also the number of stages of the elastic linkage members can be suitably set, and further the spring 1 can be formed into a shape different from the hand-drum shape, for example, into a conical shape. Two or more of the springs 1 may be stacked and integrated with each other by a means such as adhesive bonding, fusion or fitting. Also, pairs of the elastic linkage members 4, formed into the lying U-shape, may be arranged to be mirror-symmetrical to each other for each pair, or three or more of the elastic linkage members 4 may be provided in the peripheral direction. Further, two or more of arrangement patterns of the elastic linkage members may be combined, or the elastic linkage member may be divided into parts different in patters in the axial direction of the spring.

A second embodiment of the spring according to the present invention will be described with reference to FIGS. 6 to 8.

Figure 6:
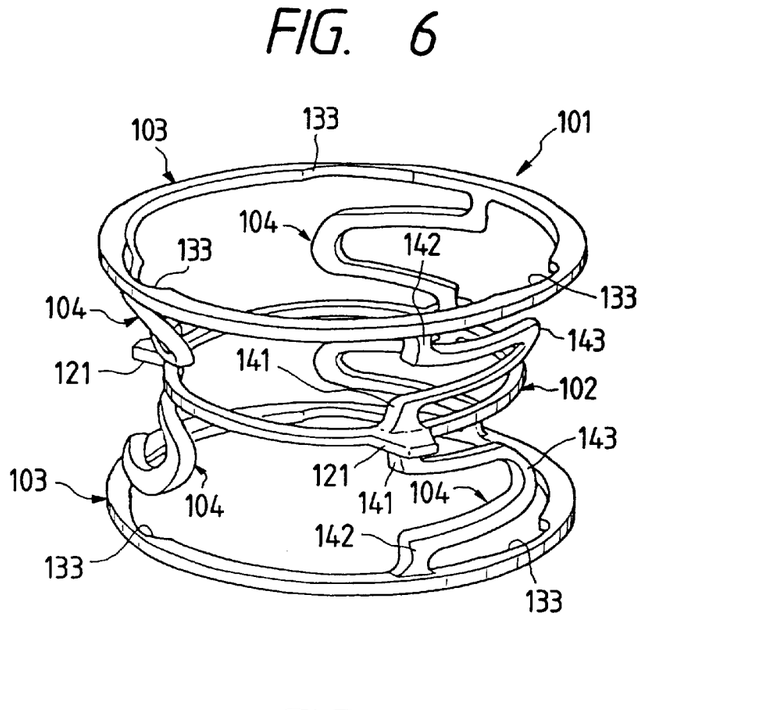
FIG. 6 is a perspective view showing a second embodiment of the spring according to the present invention.

Referring to FIG. 6, a spring 101 of the present invention includes a central annular member 102; upper and lower annular members 103, and a plurality of elastic linkage members 104. The upper and lower annular members 103 are respectively disposed in parallel on upper and lower sides of the central annular member 102 in such a manner as to be coaxial to the central annular member 102 and to be each spaced a gap d apart from the central annular member 102. The elastic linkage members 104, each of which is formed into a lying U-shape, are provided to link the central annular member 102 to each of the upper and lower annular members 103 at three circumferential positions.

Of these annular members 102 and 103, each of the upper and lower annular members 103 has the same radius r3 and the central annular member 102 has a radius r2 smaller than the radius r3 of each of the upper and lower annular members 103.

Figure 7:
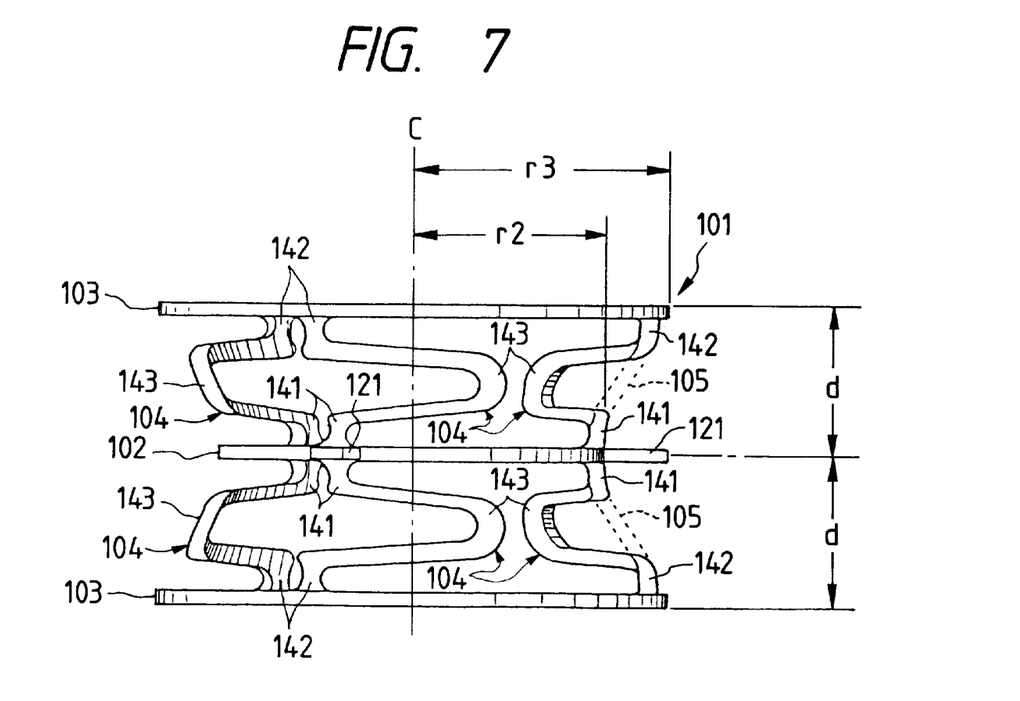
FIG. 7 is a front view showing the second embodiment of the spring.
Figure 8:
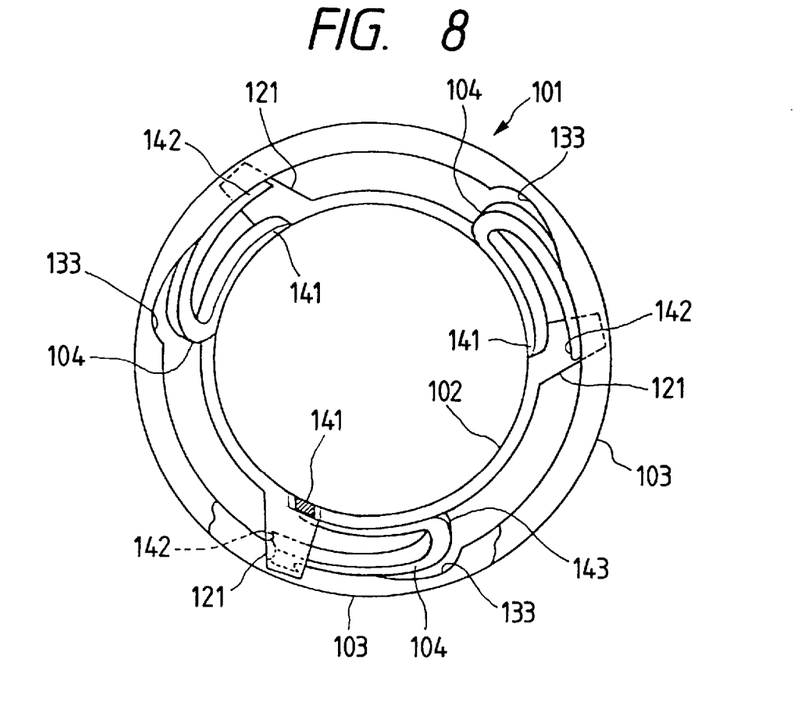
FIG. 8 is a plan view with a portion cutaway, showing the second embodiment of the spring.

As shown in FIG. 7, each elastic linkage member 104 is disposed along a virtual cylindrical face 105 formed into an approximately hand-drum shape by the annular members 102 and 103. For this elastic linkage member 104, one end portion 141 continuous to the central annular member 102 and the other end portion 142 continuous to each of the upper and lower annular members 103 are offset from each other in the radial direction so as not to be overlapped to each other in the axial direction C (expansion/contraction direction of the spring 101), that is, in the vertical direction in FIG. 7 when the spring 101 is compressed.

A restriction plate 121 is formed on an outer peripheral side of a portion near a position at which the one-end portions 141 of the elastic linkage members 104 positioned on the upper and lower sides of the central annular member 102 are in contact with each other, for preventing the other end portions 142 of the above elastic linkage members 104 from being in contact or interference with each other when an excessive compressive load is applied to the spring 1. In addition, each of the upper and lower annular members 103 has arched cutouts 133 at portions on the inner peripheral side to which curved portions 143 of the elastic linkage members 104 are overlapped in the axial direction C when the spring 101 is compressed, for preventing the annular member 103 from being in contact with the curved portions 143 of the elastic linkage members 104.

Like the spring 1 in the first embodiment, the spring 101 is molded from a synthetic resin into one body.

Figure 9:
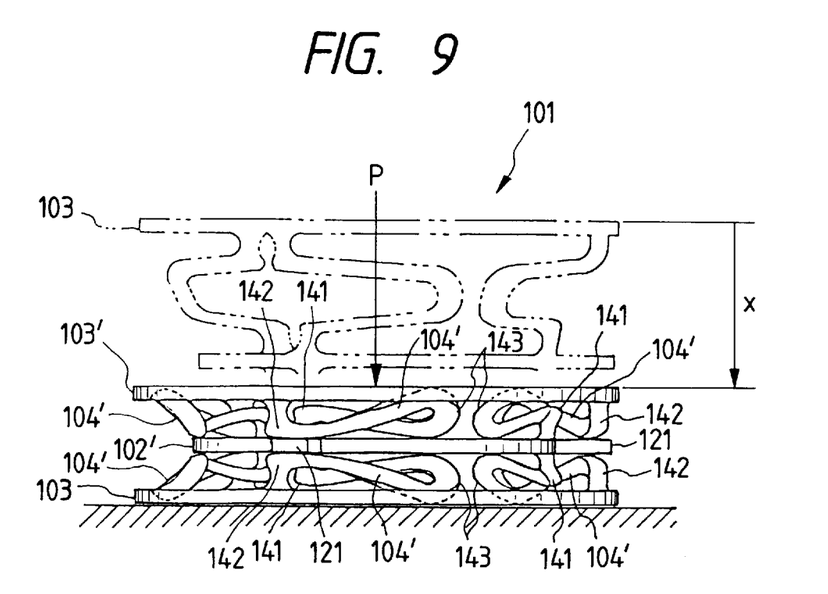
FIG. 9 is a front view with a portion cutaway, showing a state in which the second embodiment of the spring is elastically deformed.

When the spring 101 is applied with an excessive compressive load P more than a value imparting a critical elastic deformation, the curved portions 143 of the upper and lower elastic linkage members 104 are, as shown in FIG. 9, in contact with the central annular member 102 and also the other end portions 142 of the elastic linkage members 104 are in contact with the upper and lower flat surfaces of the restricting plate 121, to thereby restrict the elastic deformation more than the above critical value.

Accordingly, even when the spring 101 is three-dimensionally tilted due to bending and twisting of the other end portions 142 of the elastic linkage members 104, it can be prevented from being brought into an unstable supporting state or being broken due to contact between corner portions of the other end portions 142 or stagger between outer and inner sides of the other end portions 142. Thus, the spring 101 can usually ensure a stable supporting state.

It should be noted that the restriction plate 121 may be widely formed, and further it may be formed as a flange shape extending over the entire periphery of the annular member 102. Further, in the case where a plurality of the springs 101 having the same shape are joined to each other, a restriction plate for preventing contact or interference between the one-end portions 141 of the elastic linkage members 104 may be formed on the inner peripheral side of the annular member 103 having a larger diameter.

A typical embodiment of a spring assembly of the present invention will be described below with reference to FIGS. 10 to 14.

Referring to these figures, a spring assembly 200 of the present invention includes a pair of upper and lower network plane members 201 and 202, and a number of springs 203 held therebetween.

Figure 10:
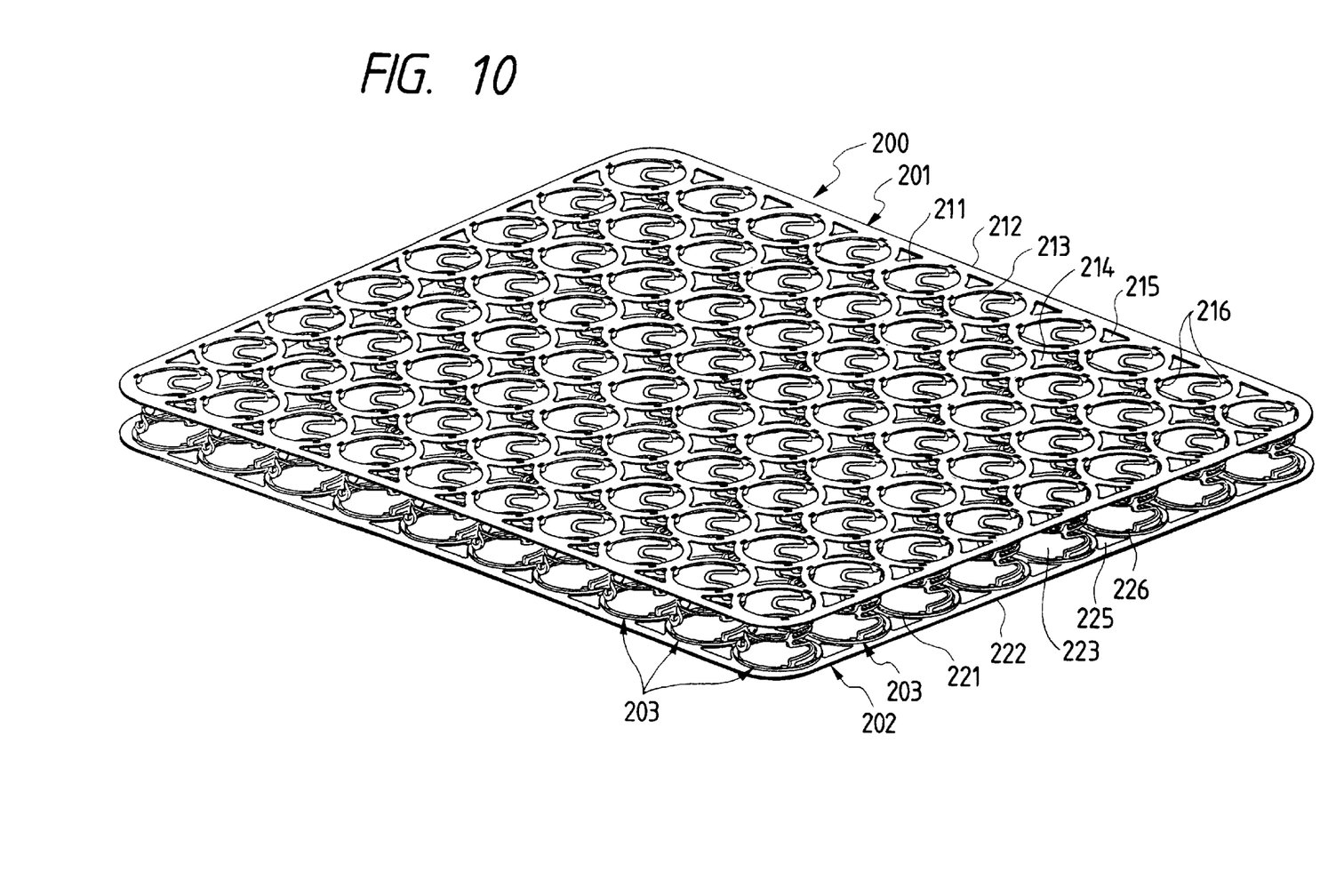
FIG. 10 is a perspective view of a first embodiment of a spring assembly for a mattress according to the present invention.
Figure 11:
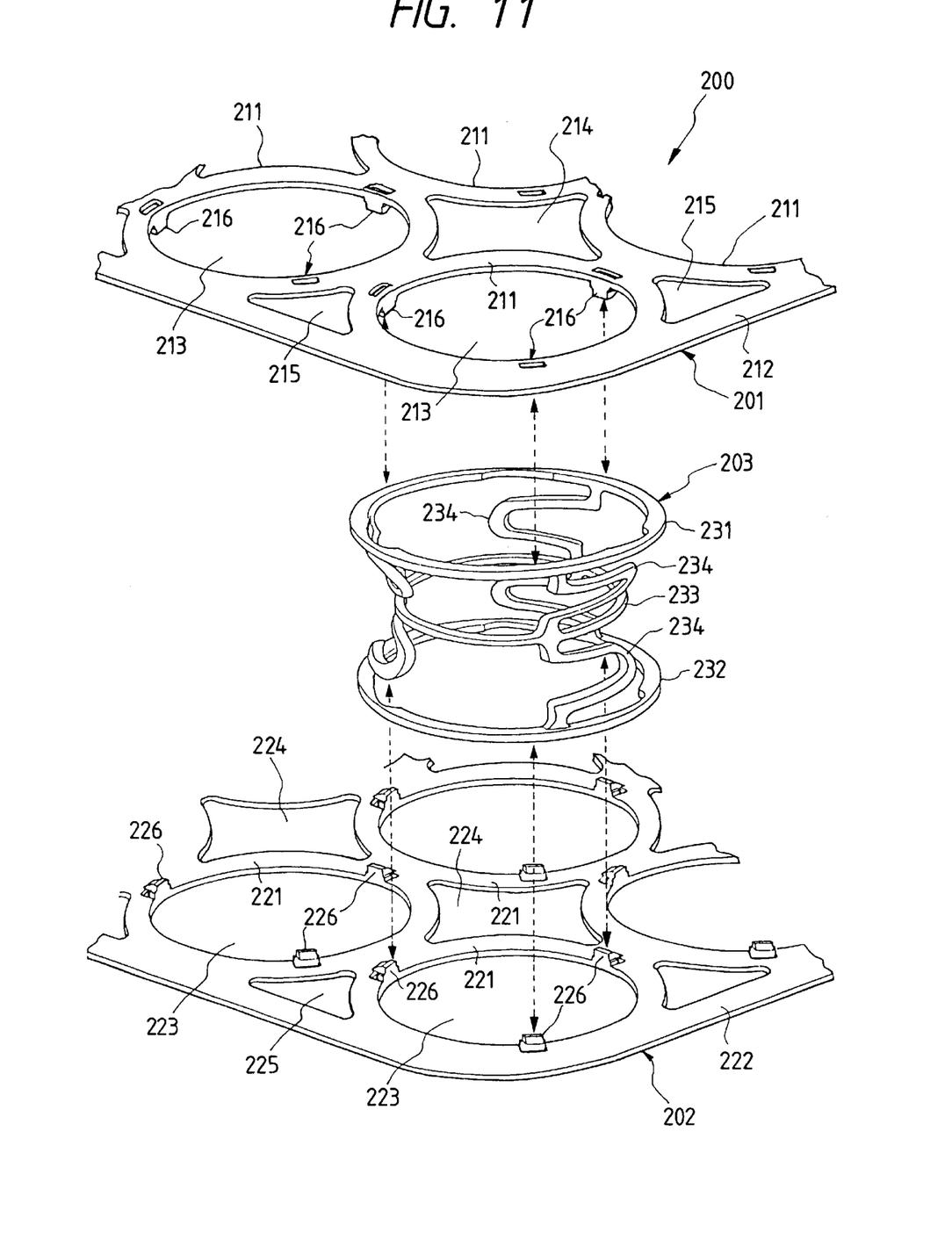
FIG. 11 is a perspective view showing a process of manufacturing the first embodiment of the spring assembly for a mattress.
Figure 13:
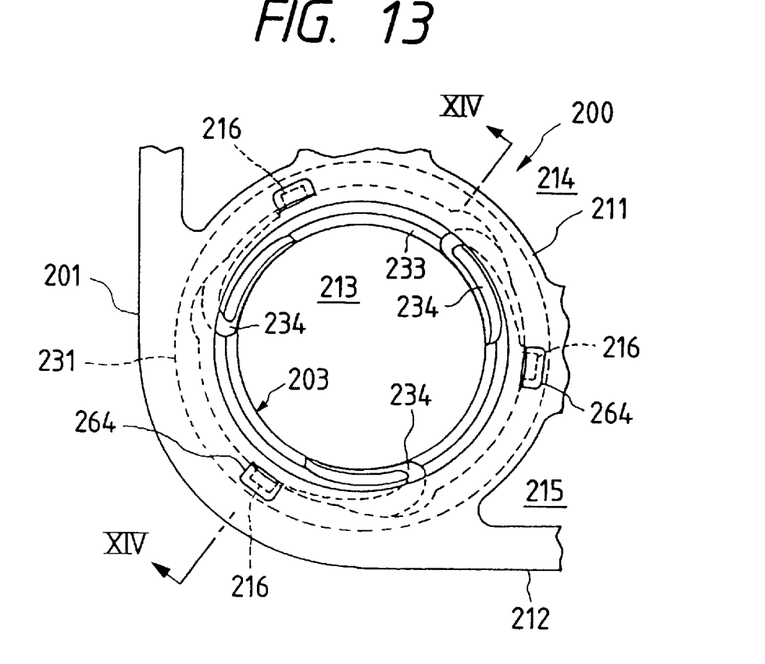
FIG. 13 is a partial plan view showing the first embodiment of the spring assembly for a mattress.

The network plane member 201 (or 202), molded from a synthetic resin into one body, has a number of annular bodies 211 (or 221) flatly joined to each other. Each annular body 211 (or 221) is formed into a shape similar to but slightly wider than an annular member 231 (or 232) at an upper or lower end of the spring 203 having the same structure as that previously described in detail. Further, peripheral portions 212 (or 222) of the annular bodies 211 (221) are linearly joined to each other, whereby the network plane member 201 (or 202) is formed into a rectangular sheet. The network plane member 201 (or 202) has circular holes 213 (or 223) at central portions of the annular bodies 211 (or 221); approximately square through-holes 214 (or 224) at portions surrounded by adjacent ones of the annular bodies 211 (or 221); and approximately triangular through-holes 215 (or 225) at the peripheral portions 212 (or 222). Thus, the network plane member 201 (or 202) has the porous network structure with a large number of the through-holes as a whole.

Figure 14:
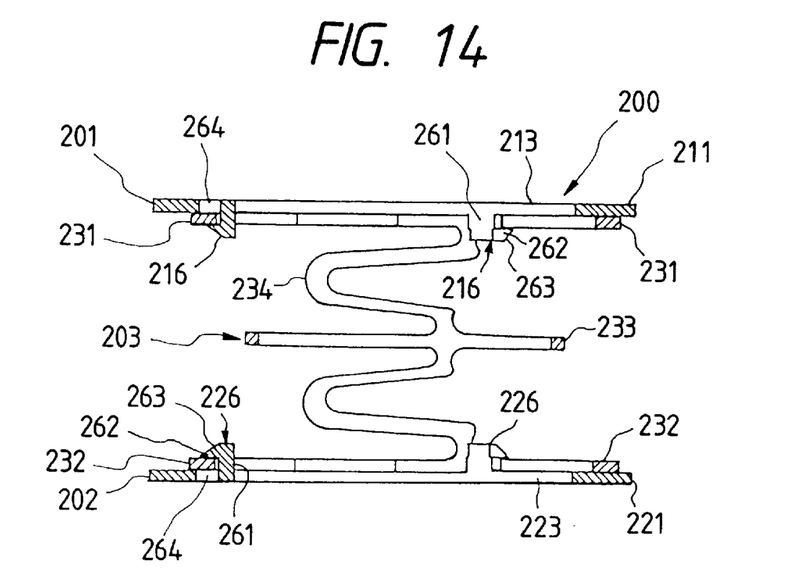
FIG. 14 is a sectional view taken on line XIV—XIV of FIG. 13.

Each annular body 211 (or 221) of the network plane member 201 (or 202) has three locking members 216 (or 226) spaced at equal intervals in the peripheral direction thereof. Each locking member 216 (or 226) is, as shown in FIG. 14, erected along the circular hole 213 (or 223) formed at the central portion of the annular body 211 (or 221). The locking member 216 (or 226) has a base portion 261 to be brought in contact with the inner periphery of the annular member 231 (or 232) of the spring 203, and a locking portion 262 formed at a leading end portion of the base portion 261 in such a manner as to project outward from the circumference of the base portion 261. A further leading end side of the locking portion 262 forms a tilting face 263. The tilting face 263 allows the annular member 231 (or 232) at the upper end or lower end of the spring 203 to be press-fitted and locked with the locking portion 262. Reference numeral 264 indicates a through-hole for preventing occurrence of undercut of the locking portion 262 upon formation of the network plane member 201 (or 202) by molding.

Figure 12:
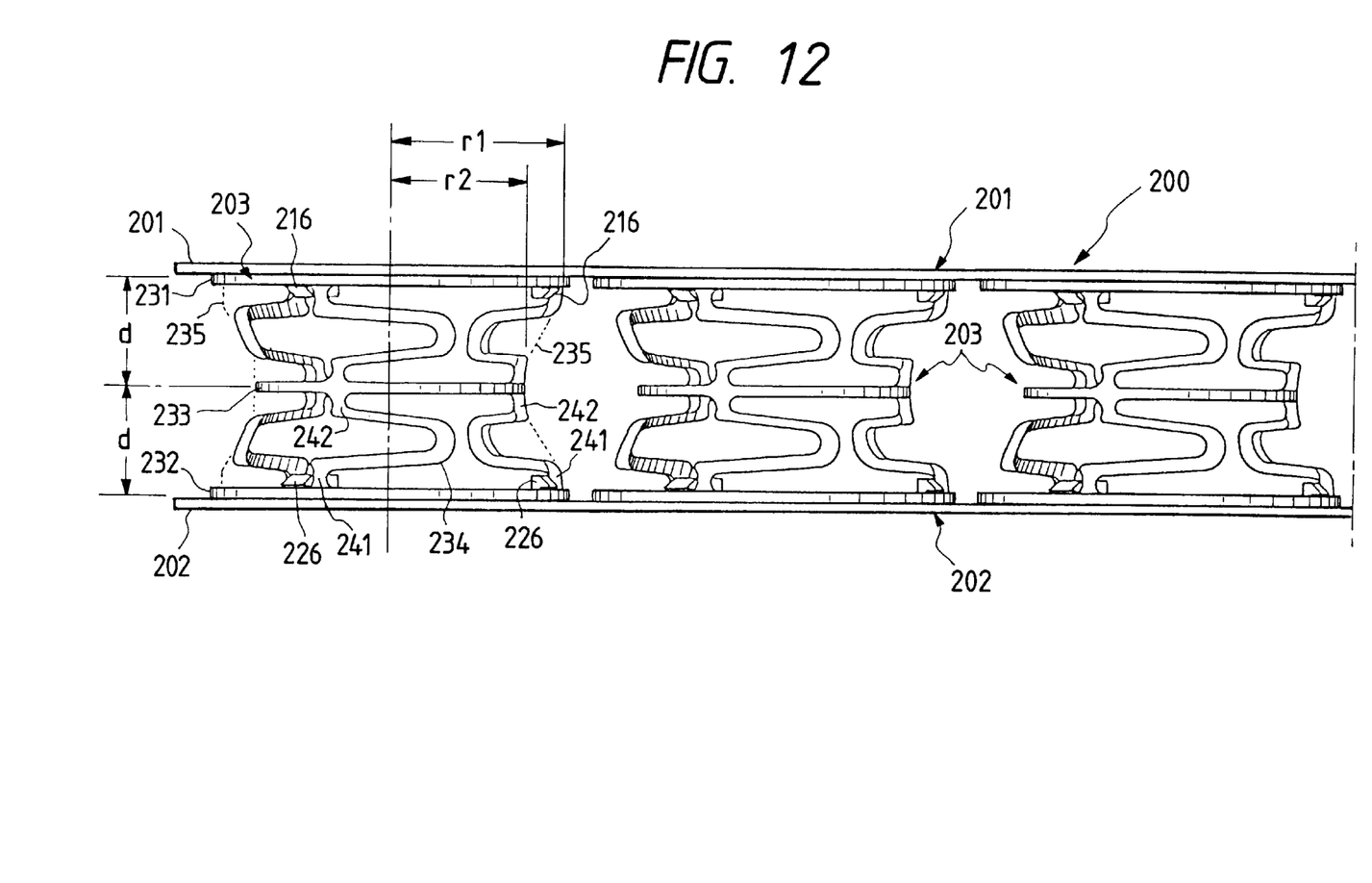
FIG. 12 is a partial side view showing the first embodiment of the spring assembly for a mattress.

Like the spring 1 in the first embodiment, the spring 203 includes a central annular member 233, upper and lower annular members 231 and 232, and a plurality of elastic linkage members 234. The upper and lower annular members 231 and 232 are respectively disposed in parallel on upper and lower sides of the central annular member 233 in such a manner as to be coaxial to the central annular member 233 and to be each spaced a gap d apart from the central annular member 233. The elastic linkage members 234, each of which is formed into a lying U-shape, are provided to link the central annular member 233 to each of the annular members 231 and 232 at three circumferential positions.

Of these annular members 231, 232 and 233, each of the upper and lower annular members 231 and 232 has the same radius r1, and the central annular member 233 has a radius r2 smaller than the radius r1 of each of the upper and lower annular members 231 and 232. As shown in FIG. 12, each elastic linkage member 234 is disposed along a virtual cylindrical face formed into an approximately hand-drum shape by the annular members 231, 232 and 233, and one end portion 241 continuous to each of the annular members 231 and 232 and the other end portion 242 continuous to the central annular member 233 are offset from each other in the radial direction so as not to be overlapped to each other in the axial direction (extraction/contraction direction of the spring 203).

The spring assembly 200 for a mattress is formed of the springs 203 and the network plane members 201 and 202 by a manner of press-fitting, for example, the lower annular members 232 of the springs 203 with the locking members 226 of the lower network plane member 202 to rigidly lock the springs 203 at respective positions of the annular members 221; overlapping the upper network plane member 201 on the springs 203 fixed on the lower network plane member 202; and press-fitting the locking members 216 of the upper network plane member 201 with the upper annular members 231 of the springs 203.

In this way, a number of the springs 203 are held between the upper and lower network plane members 201 and 202, to form an integral spring assembly 200. Then, elastic layers such as a web, heat insulating sheet, and air-permeable sheet are overlapped on the spring assembly 200, followed by covering with a side texture, to form a mattress. The mattress thus formed of the spring assembly 200 is very lightweight, and therefore, such a mattress can be used not only for a bed but also as a conventional fold type urethane mattress.

Each of the network plane members 201 and 202 and springs 203 is formed from a synthetic resin into one body typically using a die. The spring 203 may be formed from a resin high in bending strength, particularly, high in repeated bending stress, for example, a polypropyrene, polyamide, or polyacetal based resin.

Meanwhile, each of the network plane members 201 and 202, which is required to allow independent deformation of the springs 203 directly applied with a load, may be basically formed from a softer resin or a synthetic resin elastomer. The upper and lower network members 201 and 202 may be different in terms of hardness/flexibility.

The flexibility of each of the network plane members 201 and 202 varies depending on thickness of each annular member 211 (or 221), that is, respective sizes of each circular hole 213 (or 223), through-hole 214 (or 224), and through-hole 215 (or 225). Similarly, the hardness of the spring 203 varies depending on thicknesses and shapes of the members 231, 232, 233 and 234 (particularly, elastic linkage member 234). As a result, the entire hardness of the spring assembly 200 may be set in consideration of these geometrical and material effects. In other words, a plurality of kinds of the spring assemblies 200 for mattresses different in feeling can be obtained by preparing a plurality of kinds different in shape, material, and physical property for each of the network plane members 201 and 202 and the springs 203, and changing the combination thereof.

In use of the spring assembly 200 formed of the network plane members 201 and 202 and a number of the springs 203, a load is suitably distributed by the network plane members 201 and 202 and is supported by the springs 203 elastically deformed depending on respective pressures applied thereto. In particular, it is possible to suppress unnecessary vibration and swinging of the spring assembly 200 caused upon turn-over of a user in bed by cushioning and vibration-proof functions due to viscoelasticities of the synthetic resin materials forming the spring assembly 200, to prevent occurrence of noise by eliminating creak as in the conventional metal spring assembly for a mattress, and to make easy handling of the spring assembly upon transportation because of the reduced weight.

Although in the above embodiment the network plane member 201 (or 202) is formed into such a shape that the annular bodies 211 (or 221) corresponding to the annular members 231 (or 232) of the springs 203 are joined to each other in the longitudinal and lateral directions into the square grid pattern, the present invention is not limited thereto. For example, the annular bodies 211 (or 221) may be arranged into a hexagonal grid pattern, or may be each formed into an arbitrary shape other than the annular shape insofar as the shape of the annular body 211 (or 221) is set in consideration of the structural stability and shape retention characteristic thereof, and independence of each spring as described in the embodiment.

Further, in the above embodiment, the spring 203 is formed into the hand-drum shape with the three stages of the annular members 231, 232 and 233 and upper and lower stages of the elastic linkage members 234 for linking the annular members 231, 232 and 233 to each other; however, the present invention is not limited thereto. The number of the stages of the annular members and also the number of the stages of the elastic linkage members may be suitably selected, and the spring may be formed into a shape other than the hand-drum shape, such as a conical shape.

Figure 15:
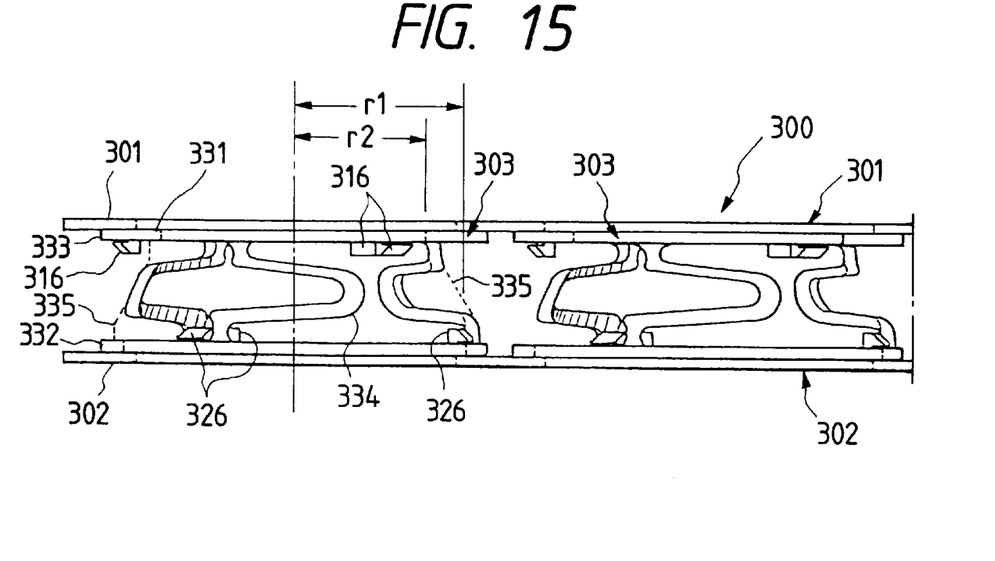
FIG. 15 is a partial side view showing a second embodiment of the spring assembly for a mattress according to the present invention.

A second embodiment of the spring assembly for a mattress according to the present invention will be described with reference to FIGS. 15 and 16. Referring to these figures, a spring assembly 300 of the present invention has springs 303 each including upper and lower annular members 331 and 332 which are joined to each other with three elastic linkage members 334 spaced at equal intervals in the peripheral direction. In this spring assembly 300, the upper and lower annular members 331 and 332 of each spring 303 are locked with locking members 316 and 326 formed on a pair of upper and lower network plane members 301 and 302 respectively so that the spring 303 is held between the network plane members 301 and 302.

In the spring 303, an inside diameter (r2) of the upper annular member 331 is smaller than an inside diameter (r1) of the lower annular member 332, and each elastic linkage member 334 is disposed along a virtual cylindrical face 335 formed by the annular members 331 and 332. The spring 303 is thus formed in an approximately conical shape. It should be noted that the arrangement of the elastic linkage members 334 is the same as that of the lower half of the spring 203 of the first embodiment.

The upper annular member 331 having the small inside diameter has a flange 333 having an outside diameter equal to that of the lower annular member 332. The flange 333 has three through-holes (portions to be locked) 336 spaced at equal intervals in the peripheral direction along a circle having the same diameter as the inside diameter (r1) of the lower annular member 332. Locking members 316 of the upper network plane member 301 are locked in the through-holes 336. With this configuration, although the spring 303 is formed into the conical shape, the shapes of the upper and lower network plane members 301 and 302 are identical to each other. As a result, the parts of the spring assembly 200 in the first embodiment can be commonly used for the spring assembly 300 in the second embodiment.

Figure 16:
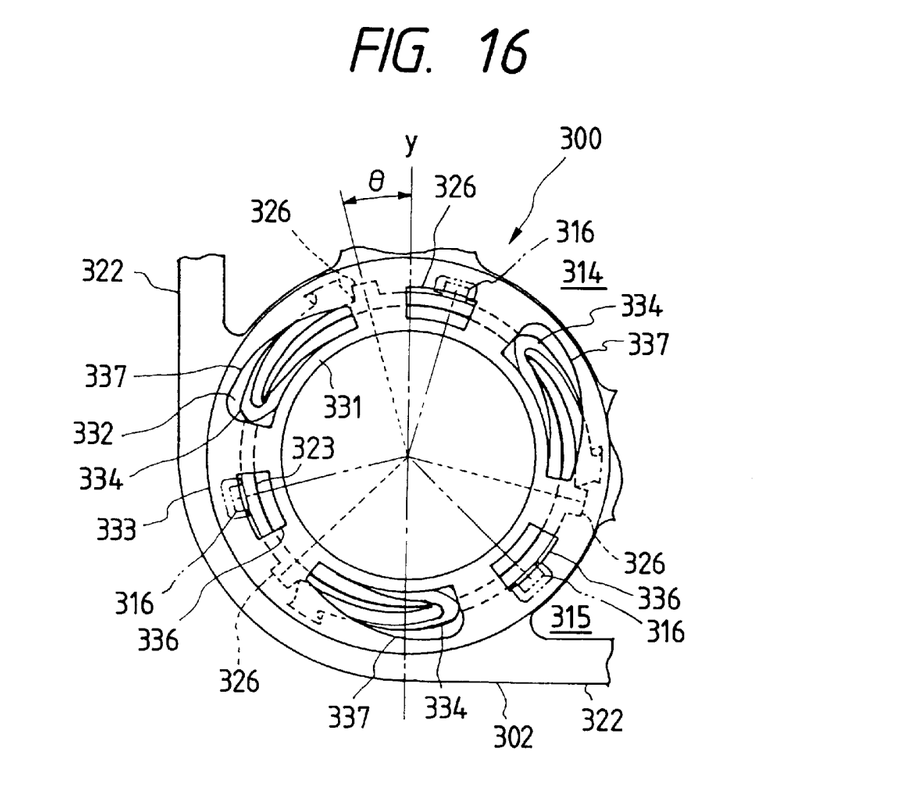
FIG. 16 is a partial plan view showing the second embodiment of the spring assembly for a mattress.

Further, in the spring assembly 300 for a mattress, as shown in FIG. 16, the locking members 326 of the lower network plane member 302 are asymmetrically arranged by tilting each of the locking members 326 at an angle θ with respect to an axial line y parallel to the longitudinal direction (or lateral direction) of the spring assembly 300, and the same member as that of the network plane member 302 is used as the upper network plane member 301 in a state being turned over around the axial line y. As a result, the upper locking members 316 are respectively offset an angle 2θ from the lower locking members 326 in the peripheral direction, and correspondingly, the through-holes 336 of the upper annular member 331 are offset from the portions to be locked of the lower annular member 332.

In the spring assembly 300 having the above configuration, although the parts of the upper and lower network plane members 301 and 302 are made common, the upper and lower locking members 316 and 326 are not overlapped to each other in the vertical direction, that is, in the thickness direction of the spring assembly 300. As a result, even when an excessive compressive load is applied to the spring assembly 300, it is possible to prevent occurrence of collision and stagger between the upper and lower locking members 316 and 326 and to allow the locking members 316 and 326 to be in contact with a flat portion such as the flange 333, and hence to ensure a stable supporting state of the spring assembly 300. The above configuration is not essential for the case in which the spring 303 has three stages or more of annular members (for example, the annular members 331, 332, and 333 in the first embodiment) and thereby the contact or interference between the upper and lower locking members 316 and 326 is not taken into consideration.

In this embodiment, the flange 333 of the spring 303 has through-holes 337 at portions to be overlapped to the elastic linkage members 334 in the vertical direction (expansion/contraction direction of the spring assembly 303) to prevent contact between the flange 333 and the elastic linkage members 334. This is effective to obtain a large elastic deformation of the spring assembly 303.

In the above embodiments, the single type spring 203 (or 303) is used; however, there may be used a stacked type having two or more of springs which are overlapped and joined to each other by a means such as adhesive bonding, fusion, or fitting. Further, pairs of the elastic linkage members 234 (or 334) of the spring 203 (or 303) may be provided in such a manner as to be mirror-symmetrical to each other for each pair, or three or more of the elastic linkage members 234 (or 334) may be provided in the peripheral direction. Further, two or more of arrangement patterns of the elastic linkage members may be combined, and the elastic linkage member may be divided into parts different in pattern in the length direction of the spring.

While the preferred embodiments of the present invention are described using the specific terms, such description is for illustrative purposes only, and it is to be understood that changes and variations may be made without departing from the spirit or scope of the following claims.

What is claimed is:

1. A spring formed from a synthetic resin comprising:
   a plurality of annular members arranged coaxially and spaced from each other in an axial direction, wherein adjacent ones of the annular members have different radii; and
   a plurality of elongated elastic linkage members having a U-shape extending in a peripheral direction when viewed in a radial direction defined by the annular members, the linkage members being disposed between two adjacent annular members and connected thereto at two ends of the U shape.

2. The spring of claim 1, wherein at least one of the annular members has cutout portions that overlap with a curved portion of the U shape of the linkage members when viewed along the axial direction.

3. The spring of claim 2, wherein two connection points of each linkage member on the two adjacent annular members are offset from each other in the peripheral direction when viewed along the axial direction such that one straight portion of the U-shaped linkage member is longer than another straight portion, and wherein the cutout portions are provided on the annular member that is connected to the longer one of the straight portions of the linkage members.

4. The spring of any one of claims 1 to 3, wherein at least one of the annular member is connected to linkage members on both sides, the at least one annular member having at least one restriction plate protruding from an outer or inner peripheral, the restriction plate being disposed between linkage members on both sides of the annular member when the spring is depressed.

5. A spring assembly comprising:
   a plurality of springs according to claim 1,
   an upper and a lower network plane member each having locking members provided on their surfaces for respectively locking two outermost annular members of each spring to hold the spring between the upper and lower network plane members.

6. The spring assembly of claim 5, wherein the upper and lower network plane members are formed of a plurality of annular bodies joined to each other, the annular bodies having a shape corresponding to the outermost annular members of the springs, wherein the locking members are provided on the annular bodies and spaced in a peripheral direction.

7. The spring assembly of claim 5, wherein the locking members on the upper network plane are offset in the peripheral direction from the locking members on the lower network plane when viewed along the axial direction.

* * * * *